United States Patent [19]

Hishiki et al.

[11] Patent Number: 4,635,176
[45] Date of Patent: Jan. 6, 1987

[54] HIGH VOLTAGE DC GENERATOR WITH REDUCED RINGING AND VOLTAGE FLUCTUATION

[75] Inventors: Hideo Hishiki; Shunji Onodera, both of Iwai, Japan

[73] Assignee: Victor Company of Japan, Ltd., Yokohama, Japan

[21] Appl. No.: 722,500

[22] Filed: Apr. 12, 1985

[30] Foreign Application Priority Data

Apr. 15, 1984 [JP] Japan .................................. 59-75372
Sep. 11, 1984 [JP] Japan ................................. 59-189873

[51] Int. Cl.[4] ........................................... H02M 3/335
[52] U.S. Cl. ......................................... 363/21; 363/39; 363/126; 363/61; 358/190; 315/411
[58] Field of Search .................... 363/18–21, 363/39, 52–53, 44–48, 61, 126; 358/190; 315/411

[56] References Cited

U.S. PATENT DOCUMENTS

| | | | |
|---|---|---|---|
| 3,742,242 | 6/1973 | Morio et al. | 363/21 |
| 3,859,590 | 1/1975 | Cielo et al. | 363/45 X |
| 4,031,453 | 6/1977 | Teuling | 363/20 |
| 4,219,872 | 8/1980 | Englemann | 363/126 |
| 4,377,842 | 3/1983 | Cambier | 363/39 X |

Primary Examiner—Peter S. Wong
Attorney, Agent, or Firm—Pollock, VandeSande & Priddy

[57] ABSTRACT

In a high voltage DC generator, the primary winding of a flyback transformer is responsive to an input pulse for inducing a high-voltage potential in the secondary winding. A first pair of first and second diodes are connected in series from one of the secondary windings to a first output terminal. A second pair of first and second diodes are connected in series from the other terminal of the secondary winding to a second output terminal. Two capacitors are cross-coupled between the terminals of the secondary winding and the junctions of the diodes of each pair. The first diodes of each pair are turned on in response to the input pulse and the second diodes of each pair are turned on in response to the cessation of the pulse. A ringing reduction circuit comprises a resistive element, a capacitive element and a diode element, the diode and capacitive elements being arranged such that when the first or second diodes of both pairs are conductive the diode element turns on the charge the capacitive element, the resistive element being in circuit with the capacitive element to pass a current in response to the cessation of the pulse to dissipate ringing energy during the trace period.

19 Claims, 15 Drawing Figures

HIGH VOLTAGE DC GENERATOR WITH REDUCED RINGING AND VOLTAGE FLUCTUATION

BACKGROUND OF THE INVENTION

The present invention relates to a high voltage DC generator for use in the supply of high DC voltages to a cathode ray tube.

One of the important factors that determines the picture quality of a television receiver rests on the quality of the high voltage DC generator that supplies high DC voltages to the cathode ray tube. To improve the quality of the DC generator it is necessary to minimize output voltage fluctuation and ringing.

The high voltage supplies to a cathode ray tube are usually obtained from a horizontal deflection circuit by utilizing the effect of high frequency switching action of the deflection circuit on the inductance of a flyback transformer. However, the use of a flyback transformer having as many turns of wire as desired obviously results in a bulky transformer and an increase in leakage inductance between the primary and secondary windings and an increase in stray capacitance in the secondary. Since the increases in leakage inductance and stray capacitance reduce the frequency of a damped oscillation known as ringing and make it difficult to tune the ringing frequency to a desired odd integral multiple of the fundamental frequency of the flyback pulse, whereby the ringing component can be reduced to an acceptable level.

It is also desirable to allow transformers of the same type to be used in applications in which the line frequency of the horizontal deflection system may differ from one system to another or in which the scan size is controlled according to particular purposes. In these applications, the duration of the flyback pulse must be controlled to fit to the different requirements and the ringing frequency adjusted to maintain proper frequency relationship with the frequency of flyback pulse. Otherwise the ringing frequency would deviate from the optimum point, and there results an increase both in ringing and voltage output fluctuation.

A high voltage DC generator, shown and described in copending U.S. patent application Ser. No. 591,748 filed Mar. 21, 1984 and assigned to the same assignee as the present invention, comprises a horizontal deflection circuit, a flyback transformer and a rectifier which includes two pairs of diodes each connected in series from one of the opposite end terminals of the secondary winding of a flyback transformer. Two capacitors are cross-coupled from the junctions of the diodes of each pair to the end terminals of the secondary winding of the flyback transformer.

The deflection circuit includes a switching transistor which causes a current to flow through the primary winding of the flyback transformer in response to a line frequency input and induces a voltage pulse in the secondary winding of the transformer in the retrace period of each line scan. The voltage developed in the secondary winding biases one of the diodes of each pair into conduction to charge the capacitors in one direction. In the trace period that follows, the other diodes of each pair are rendered conductive to charge the capacitors in a direction that is opposite to the direction in which these capacitors are charged during the retrace period. A DC output voltage which is twice the voltage induced in the secondary winding of the flyback transformer is obtained across the output terminals.

The voltage developed in the transformer secondary winding during the retrace period of a line scan entails a ringing voltage in the trace period of the line scan. This ringing voltage is a damped oscillation at an odd harmonic of the line frequency and is determined by a leakage inductance between the primary and secondary windings of the flyback transformer and a stray capacitance produced by the final anode of the cathode ray tube. This ringing component impairs the picture quality.

Another factor that determines the picture quality is the range in which the DC output of the generator tends to fluctuate with a varying beam current of the cathode ray tube. To minimize the output voltage fluctuation a bleeder resistor is connected to the output terminals of the generator. It is found, however, that the bleeder resistor affects the ringing component in such a conflicting manner that the ringing increases with the increase in bleeder resistance. Specifically, with a bleeder resistor of 100 megohms, the output voltage fluctuation is acceptable, but the ringing is not acceptable. A bleeder resistor of 50 megohms, on the other hand, reduces the ringing component to an acceptable value but increases the output voltage fluctuation and bleeder power loss to inacceptable values.

SUMMARY OF THE INVENTION

The present invention is therefore to solve the conflicting factors of the ringing component and output voltage fluctuation associated with a high voltage DC generator.

According to the invention, the high voltage DC generator comprises a stepup transformer having primary and secondary windings, the primary winding being responsive to a pulse from a pulse generating circuit for inducing a high-voltage potential in the secondary winding. To the secondary winding of the transformer is connected a rectifying circuit which comprises a first pair of first and second diodes connected in series in a first circuit from a first end terminal of the secondary winding to a first output terminal of the generator, a second pair of first and second diodes connected in series in a second circuit from a second end terminal of said secondary winding to a second output terminal of said generator, a first capacitor connected between the second end terminal and a junction of the diodes of the first pair, and a second capacitor connected between the first end terminal and a junction of the diodes of the second pair. The first diodes of the two pairs are arranged to simultaneously conduct in response to the application of a pulse to the transformer and the second diodes of the two pairs are arranged to simultaneously conduct in response to the cessation of the pulse. A ringing reduction circuit is provided in the rectifying circuit. The ringing reduction circuit comprises a resistive element, a capacitive element and a diode element, said diode and capacitive elements being arranged such that when one of the first and second diodes of each pair conducts the diode element is conductive to charge the capacitive element, the resistive element being in circuit with the capacitive element to pass a current therethrough in response to the cessation of the pulse. The ringing energy is consumed in the resistor during the trace period.

In one preferred embodiment, the ringing reduction circuit comprises a parallel connection of a resistor and a capacitor in the second circuit and a diode connected across the first and second circuits. The voltage developed in the capacitor of the parallel connection is summed with the DC output voltage. The diode of the ringing reduction circuit is turned on during the trace period to allow the capacitor to store the ringing energy and the stored energy to bleed through the resistor.

In a second preferred embodiment, a third capacitor is connected in parallel with the series connection of the diodes of the second pair to provide a voltage multiplying function. The ringing reduction circuit comprises a series connection of a diode and a resistor in the second circuit between the second output terminal and a junction where the third resistor is connected to the second diode of the second pair. A capacitor is connected in parallel with the series connection of the second diode of the second pair and the diode of the ringing reduction circuit to provide dual functions of voltage multiplication and ringing reduction by storing energy during the retrace period through the third capacitor and discharging it during the trace period through the resistor of the ringing reduction circuit. The resistor provides dual functions of ringing reduction and circuit protection in the event that the output terminals are inadvertently short-circuited.

BRIEF DESCRIPTION OF THE DRAWINGS

The present invention will be described in further detail with reference to the accompanying drawings, in which.

DETAILED DESCRIPTION

Figure 1:
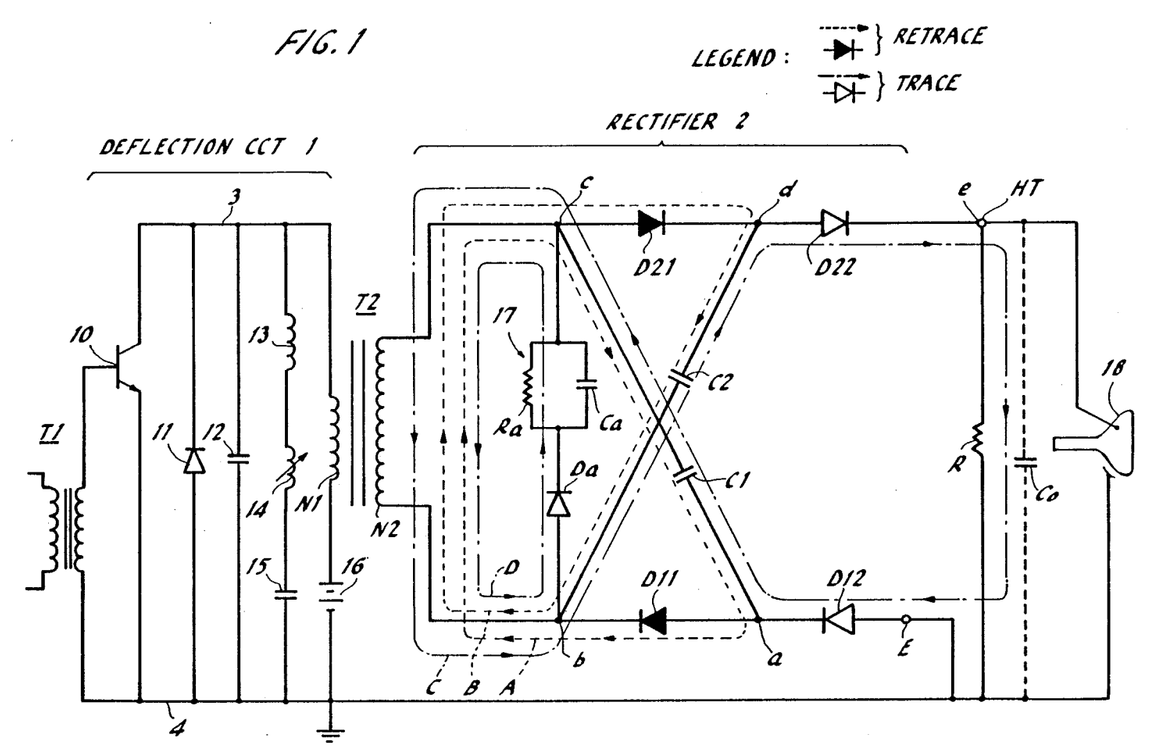
FIG. 1 is a circuit diagram of a first embodiment of the high voltage DC generator.

Referring now to FIG. 1, there is shown a first preferred embodiment of a high voltage DC generator of the present invention. The DC generator comprises an oscillator transformer T1, a horizontal deflection circuit 1 of well known circuitry, a flyback transformer T2, a rectifier 2 of a voltage doubler type and a bleeder resistor R. Horizontal scan deflection voltage is from a line frequency oscillator, not shown, through transformer T1 to the base of a transistor 10. The collector of transistor 10 is connected through positive line 3 and the primary winding N1 of flyback transformer T2 to a DC voltage source 16 and the emitter is connected through negative line 4 to ground. Across the positive and negative lines are connected a damper diode 11 in parallel with a resonant circuit including capacitor 12, horizontal deflection coil 13 of a cathode ray tube 18, amplitude adjustment coil 14 and waveform correction capacitor 15. Transistor 10 operates as a switch by generating a current through the deflection coil 13 to generate a horizontal deflection magnetic field in the cathode ray tube and a current through the primary winding N1 of transformer T2 at a predetermined line frequency during the retrace period of each line scan. A voltage pulse is induced in the secondary winding N2 of the flyback transformer in response to the primary current.

Rectifier 2 comprises a first pair of first and second diodes D11 and D12 connected in a series circuit from an end terminal of the secondary winding N2 to a ground terminal E and a second pair of first and second diodes D21 and D22 connected in a series circuit from the other end terminal of the secondary winding N2 to a high voltage output terminal HT. A first capacitor C1 is connected between a junction "a" of diodes D11 and D12 and a junction "c" at the anode of diode D21 and a second capacitor C2 is connected between a junction "d" of diodes D21 and D22 and a junction "b" at the cathode of diode D11.

The bleeder resistor R is connected between the terminals HT and E. A voltage DC output is applied from the output terminal HT to the final electrode of the cathode ray tube 18. The cathode ray tube 18 has a stray capacitance C0 which represents a capacitive load across the output terminals HT and E.

Diodes D11, D12, D21 and D22 are connected so that in the presence of a flyback pulse (during the retrace period of each line scan) the first diodes D11 and D21 of each pair are turned on to pass currents through closed passages indicated by dotted lines A and B and in the absence of the flyback pulse (during the trace period) the second diodes D12 and D22 of each pair are turned on to pass currents through closed passages indicated by a chain-dot line C.

Figure 2:
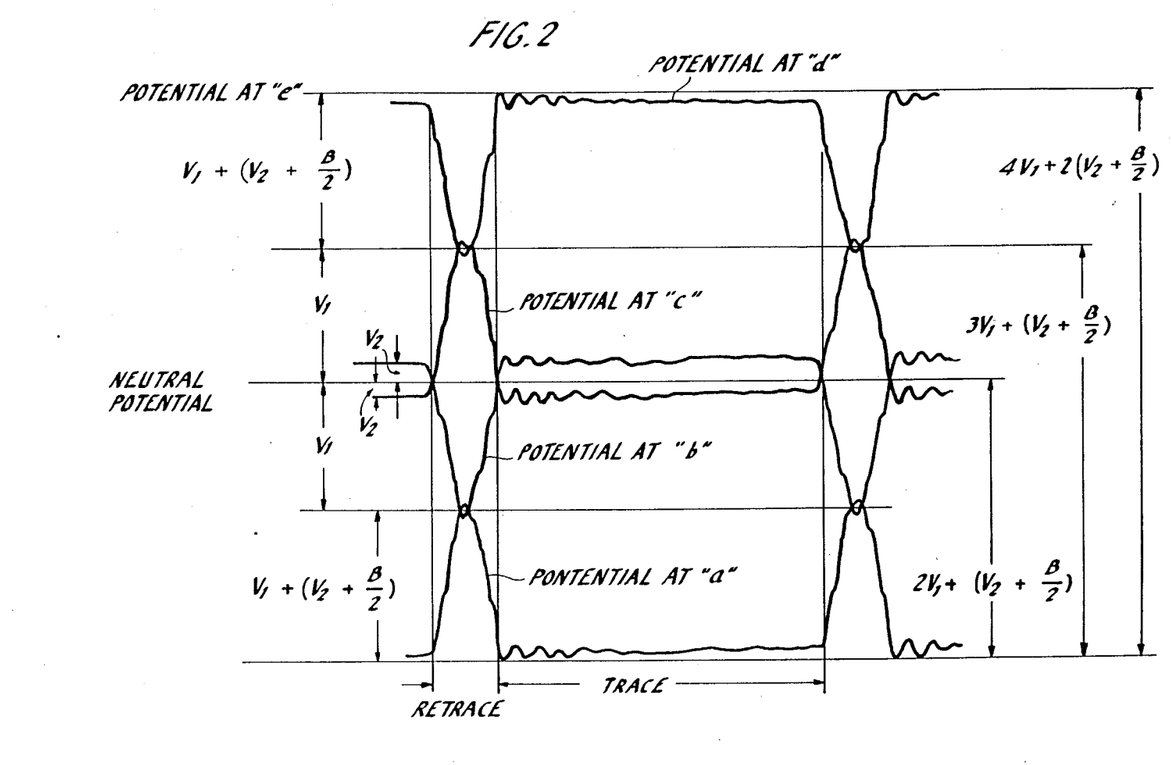
FIG. 2 is a waveform diagram associated with the first embodiment.

Voltages developed at various junctions of the circuit 2 are shown in FIG. 2, where $V_1$ is the voltage developed during retrace period across the neutral point of the secondary winding N2 and each end terminal of that winding, $V_2$ is the voltage developed during the trace period across the neutral point and each end terminal of the secondary winding N2, and B is the wave height of the ringing component. It is seen that a DC output voltage of $4V_1+2\{V_2+(B/2)\}$ appears at the output terminal HT.

According to the present invention, the rectifier 2 further includes a ringing reduction circuit 17 connected across the end terminals of the secondary winding N2. This ringing reduction circuit comprises a resistor Ra, a capacitor Ca in a parallel connection and a diode Da connected in series therewith to conduct during the trace period to cause a current to flow in a passage indicated by a chain-dot line D.

Diode Da is turned on in response to a potential difference $2\{V_2+(B/2)\}$ which is developed across the junctions "b" and "c" during the trace period. Capacitor Ca is thus charged to that potential difference and resistor Ra allows a current of a magnitude $2\{V_2+(B/2)\}/Ra$ to bleed therethrough during the trace period. The bleeding effect of resistor Ra reduces the ringing component B.

The ringing component contained in the current flowing through the passage C is allowed to pass through the bleeder resistor R. Therefore, the ringing component which would otherwise be exclusively dissipated by the bleeder resistor is partly dissipated by the resistor Ra and partly by the bleeder resistor R. Hence, it is not necessary to reduce the resistance of bleeder resistor R to a level which is appropriate for the reduction of ringing but not appropriate for the reduction of output voltage fluctuation and bleeder power loss.

Figure 3:
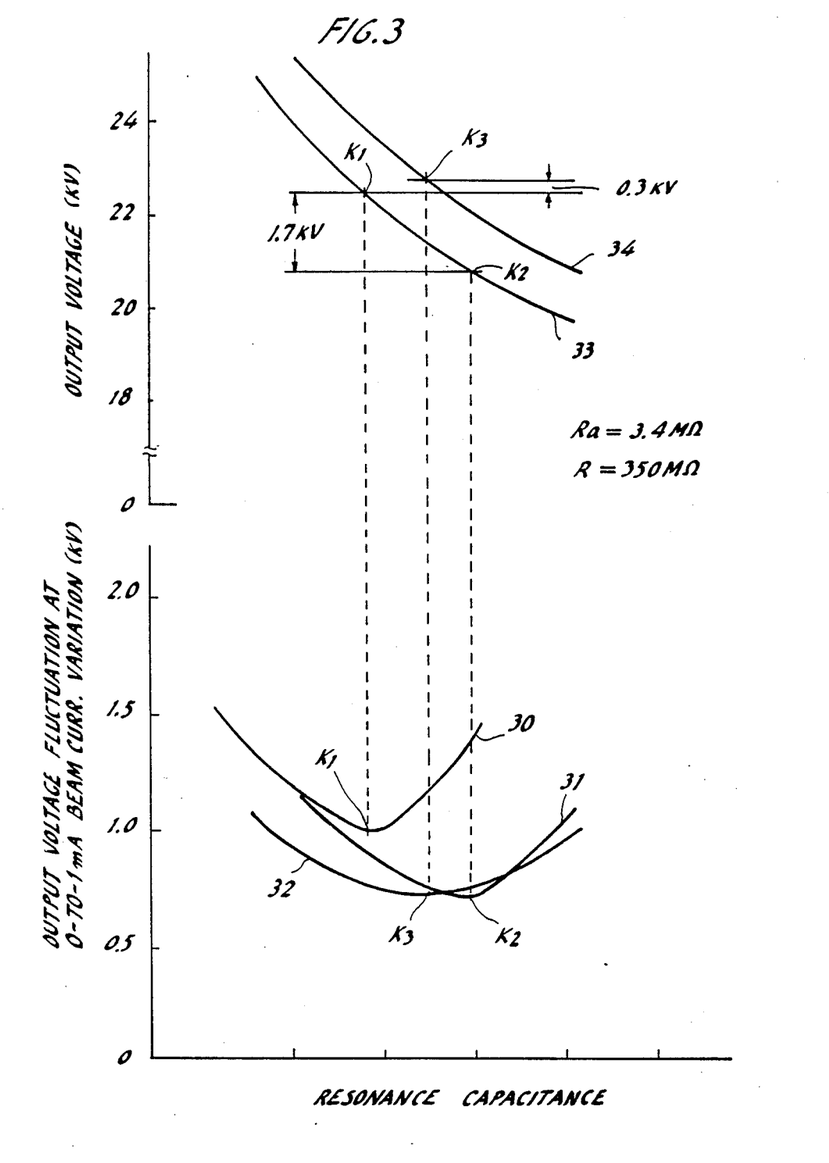
FIG. 3 is a graphic illustration of the output voltage and the output voltage fluctuation plotted against resonance capacitance.

The embodiment of FIG. 1 has an output voltage fluctuation indicated by a curve 31 in FIG. 3 and the minimum value of that fluctuation occurs at a point $K_2$ which is smaller than that available with the prior art in which the minimum point is shown at $K_1$ on curve 30, but shifted in resonance capacitance. This is due to the fact that the conduction of the ringing reduction circuit 17 during the trace period has the effect of increasing the effective stray capacitance of the secondary winding N2. The shifting of the minimum point results in a flyback pulse having a greater pulse duration and hence in the reduction in the DC output voltage from point $K_1$ to $K_2$ on curve 33.

Figure 4A:
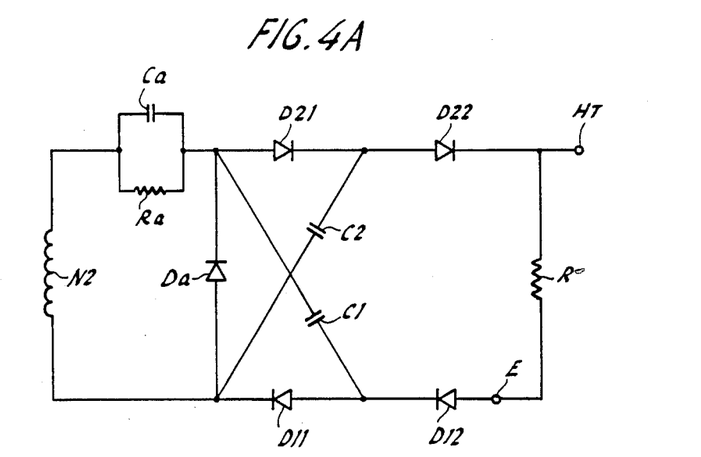
FIGS. 4A and 4B are circuit diagrams of modified embodiments of the DC generator.
Figure 4B:
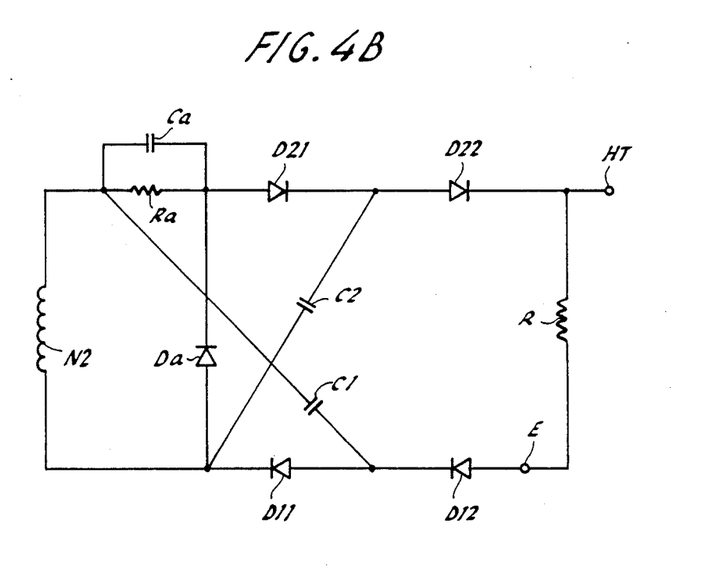

Embodiments shown in FIGS. 4A and 4B eliminate the voltage reduction problem by applying the potential $2\{V_2+(B/2)\}$ which is developed across the resistor-capacitor parallel connection of the ringing reduction circuit 17 to the high voltage output terminal HT by connecting the parallel connection of resistor Ra and capacitor Ca in series with the diodes D21 and D22 as shown in FIGS. 4A and 4B. Obviously, the resistor-capacitor parallel connection of the ringing reduction circuit may also be connected in series with the diodes D11 and D12 because of the symmetrical configuration of the rectifier circuit 2 with respect to the neutral point of the secondary winding N2. The DC output voltage at terminal HT is therefore equal to $4V_1+4\{V_2+(B/2)\}$. As shown in FIG. 3, the embodiments of FIGS. 4A and 4B have a minimum output voltage fluctuation at a point $K_3$ on curve 32 and at which point the DC output voltage crosses a curve 34 at point $K_3$ which is higher than points $K_1$ and $K_2$ on curve 33.

Figure 5A:
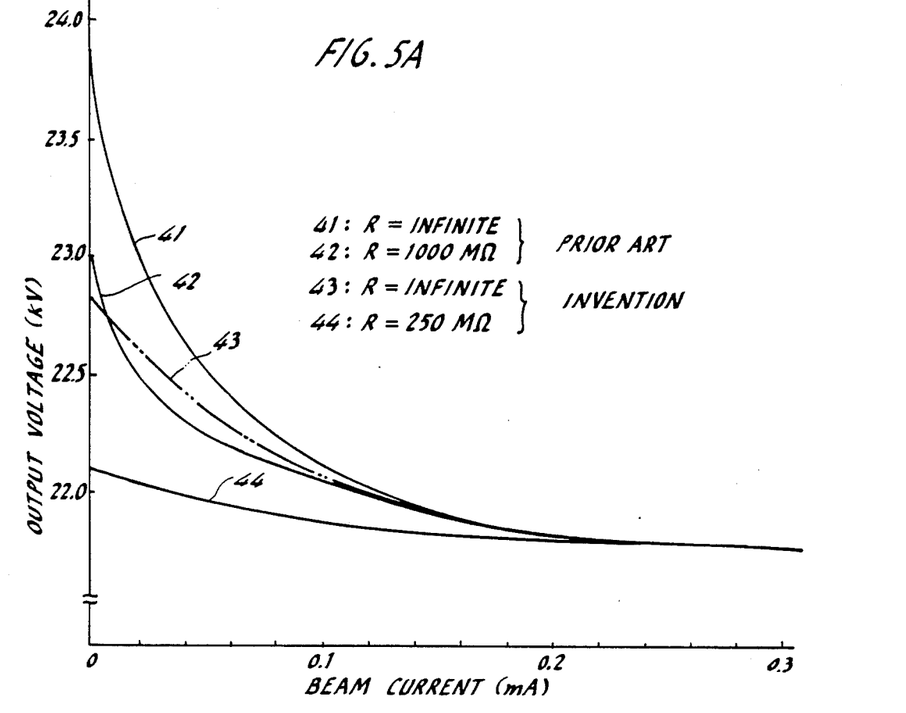
FIGS. 5A and 5B are graphic illustrations of output voltage and ringing ratio respectively which are plotted against beam current of a cathode ray tube.
Figure 5B:
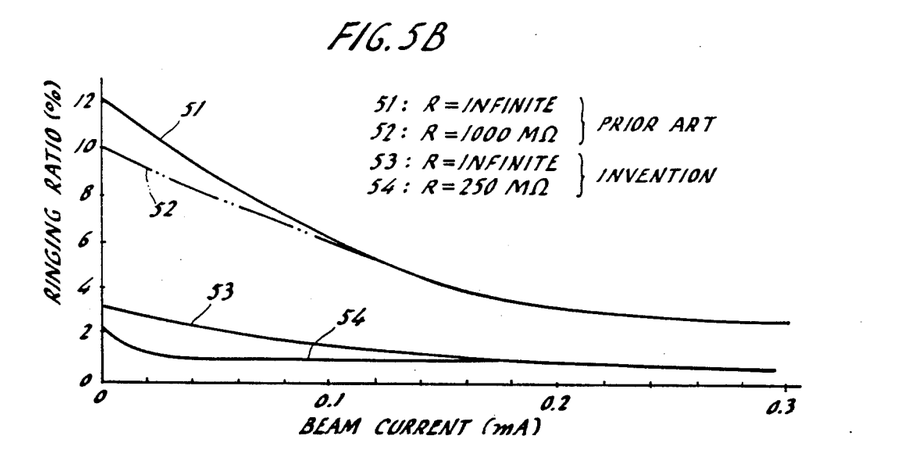

FIGS. 5A and 5B are graphic illustrations of data for comparison between the operating characteristics of the prior art with those of the embodiments of FIGS. 4A and 4B in terms of the output voltage and the ringing ratio which is given by $B/\{V_1+V_2+(B/2)\}$.

Curves 41 and 51 show the output voltage and ringing ratio of the prior art having no bleeder resistor (infinite value) and curves 42, 52 indicate the corresponding characteristics of the prior art having a bleeder resistor of 1000 megohms. Curves 43 and 53 indicate the output voltage and ringing ratio of the FIGS. 4A and 4B embodiments having no bleeder resistor and a ringing reduction resistor of 3.9 megohms, curves 44 and 54 indicating the corresponding characteristics of the same embodiments having a bleeder resistor of 250 megohms and a 3.9-megohm ringing reduction resistor Ra.

Figure 6:
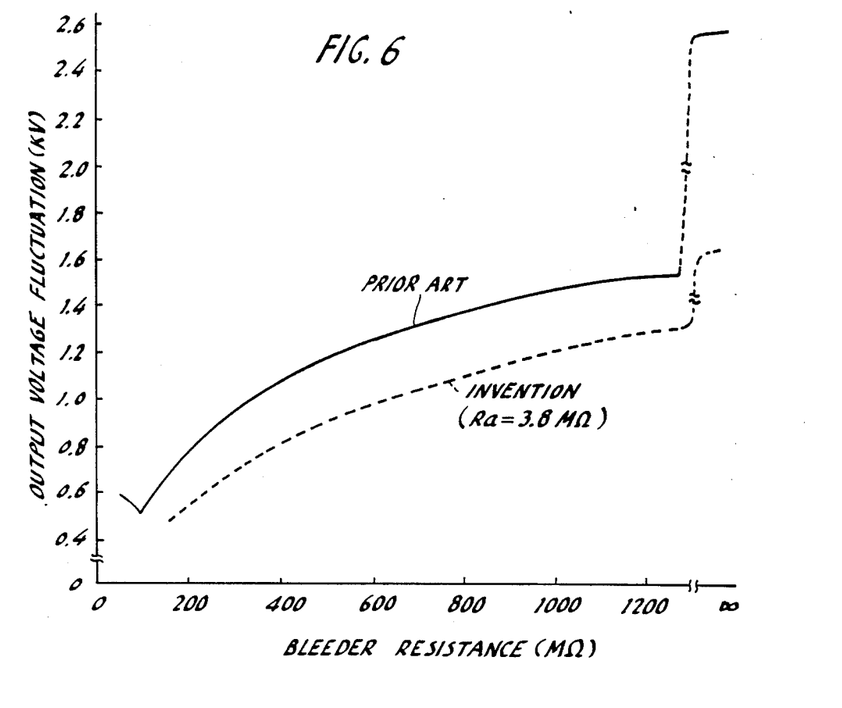
FIG. 6 is a graphic illustration of an output voltage fluctuation plotted against bleeder resistance.

FIG. 6 is a graphic representation of output voltage fluctuation of the embodiments of FIGS. 4A and 4B plotted against bleeder resistances for comparison with the prior art. It is seen that a bleeder resistance of 181 megohms (in this case bleeder power loss is 2.7 watts for a DC voltage output of 22.0 kV) results in an output voltage fluctuation substantially equal to that attained by the prior art having a bleeder resistance of 100 megohms (in the latter case the bleeder power loss is 4.8 watts for a DC output voltage of 22.0 kV). The ringing reduction resistor Ra has a power loss of about 0.4 watt. Even if this power loss is taken into account, the power loss of the present invention is about 1.5 watts smaller than that of the prior art.

Figure 7:
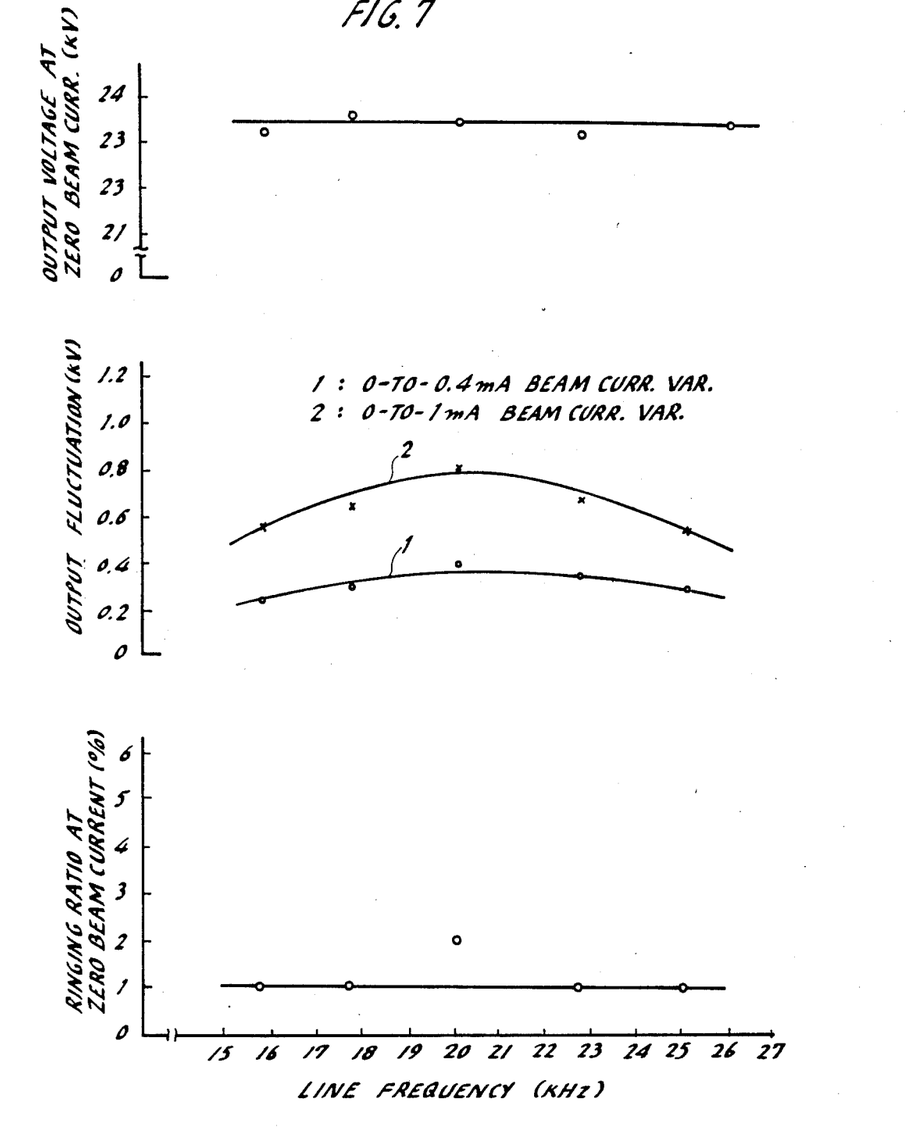
FIG. 7 is a graphic illustration of output voltage, output voltage fluctuation and ringing ratio plotted against line frequency.

FIG. 7 shows the output voltage, output voltage fluctuation and ringing ratio of the embodiments of FIGS. 4A and 4B plotted against line frequencies with the retrace period having a constant duty ratio of 0.165. It is seen that the ringing ratio at zero beam current does not significantly vary with line frequency. This means that the embodiments of FIGS. 4A and 4B operate satisfactorily at different line frequencies and hence standardized flyback transformers can be used for applications in which the line frequency may differ between different displays.

Figure 8:
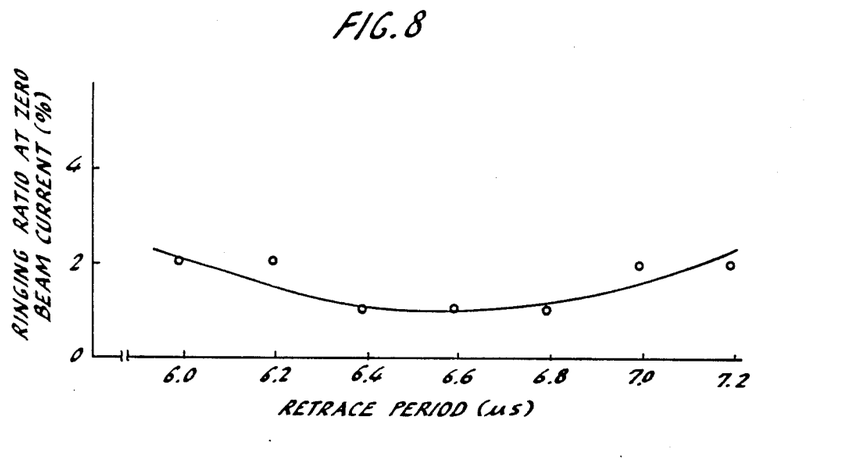
FIG. 8 is a graphic illustration of ringing ratio plotted against retrace period of line scan.

The data shown in FIG. 7 were derived with the combined inductance of coils 13 and 14 being in the range between 0.7 and 2.2 mH so that the horizontal scan width of the raster is maintained substantially constant and with the source voltage 16 at 110 volts. Other circuit elements used in deriving the data are as follows: R=230 megohms, Ra=3.95 megohms, C1, C2, Ca=470 picofarads. If the line frequency is at 25.0 kHz, the ringing ratio at zero beam current value does not change appreciably as shown in FIG. 8 as a function of retrace period.

Figure 9:
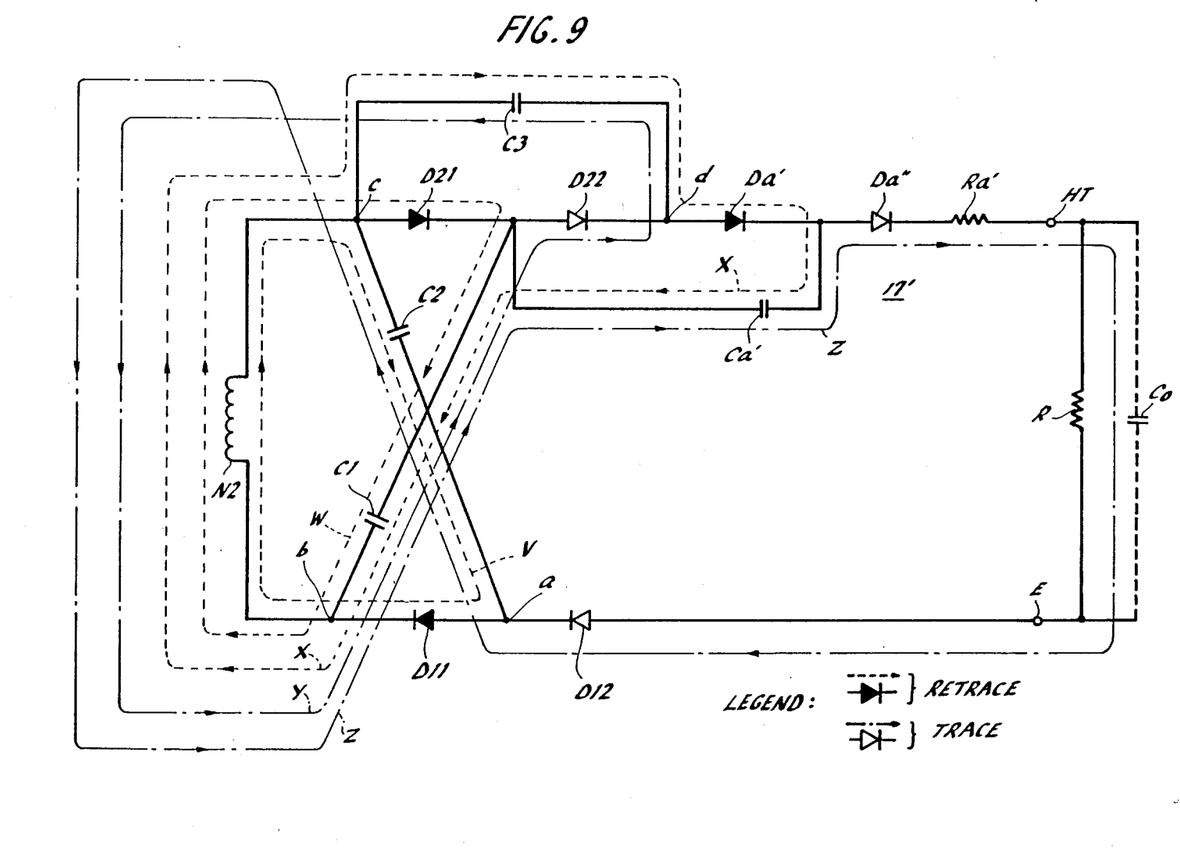
FIG. 9 is a circuit diagram of a second embodiment of the DC generator.

FIG. 9 is an illustration of a second preferred embodiment of the present invention in which parts corresponding to those in FIG. 1 are marked with the same numerals as used in FIG. 1. This embodiment involves the use of an additional capacitor C3 and a ringing reduction circuit 17' comprising diodes Da', Da'', a capacitor Ca' and a resistor Ra'. Capacitor C3 is connected between junctions "c" and "d". Diodes Da', Da'' and resistor Ra' are connected in series with the diodes D21 and D22 and capacitor Ca' is connected between the junction of diodes D21 and D22 and the junction of diodes Da' and Da''.

During the retrace period, diodes D11, D21 and Da' are biased into conduction to cause currents to flow through passages V, W and X and during the trace period, diodes D12, D22, Da'' are biased into conduction to cause currents to flow through passages Y and Z. By the provision of capacitors C3 and Ca' which store a total voltage of $2V_1+2\{V_2+(B/2)\}$, the DC output voltage developed at terminal HT equals $6V_1+4\{V_2+(B/2)\}$.

Figure 10:
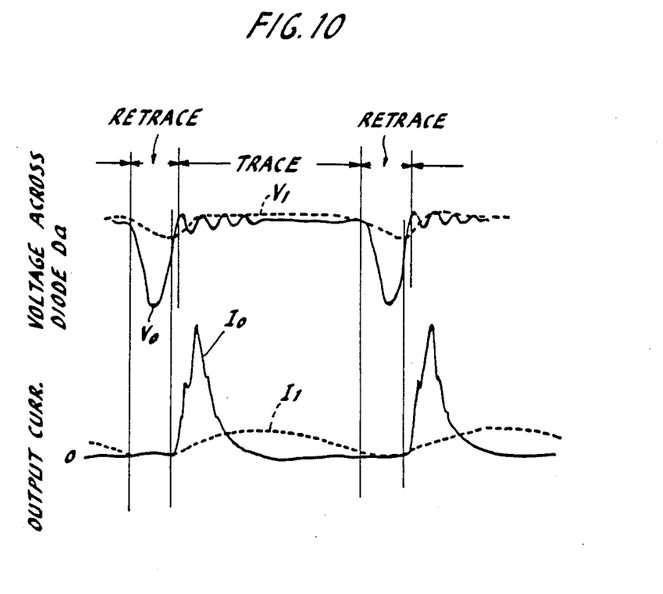
FIG. 10 is a waveform diagram associated with the second embodiment.

In the absence of the resistor Ra', the voltage across diode Da'' would take the waveform $V_0$ having a negative peak in the retrace period, shown at FIG. 10, which is followed by a substantial amount of ringing component and the output current through terminal HT would take the waveform shown at $I_0$ having a positive peak in the trace period. This positive peak current is generated as a result of the ringing voltage.

In the presence of the resistor Ra', the energy stored on capacitor Ca' during the retrace period by current flowing through passage X is discharged during the trace period through passage Z and dissipated by resistor Ra'. As a result, the voltage across diode Da'' reduces in amplitude and the ringing component also reduces to an insignificant level. Resistor Ra' also serves as a protection resistor in the event that the output terminal HT is short-circuited to ground. The output current thus adopts a waveform $I_1$ which gradually rises and falls during the trace period. This waveform is determined by the time constant value of capacitors C1, C2 and C0 and resistor Ra' and the forward resistance value of diode Da". By appropriately determining the time constant value, it is possible to reduce the amplitude of the current waveform $I_1$ to an acceptable level. Because of the small current through resistor Ra', the voltage drop across resistor Ra' by current $I_1$ does not significantly reduce the DC output voltage of the high voltage DC generator.

A suitable value for resistor Ra' is 50 kilohms or greater to deliver a DC voltage of from 20 to 25 kilovolts.

Figure 11:
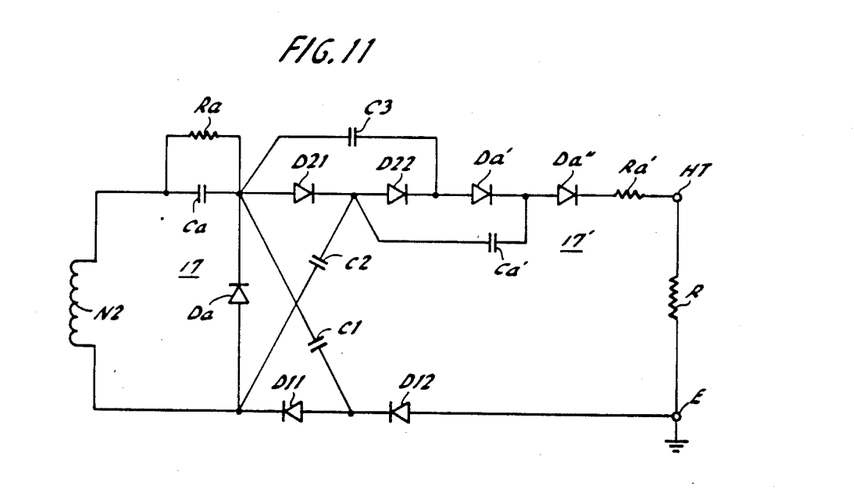
FIG. 11 is a circuit diagram of a modification of the second embodiment.

The embodiment of FIG. 9 can be modified as shown at FIG. 11 by the inclusion of the ringing reduction circuit 17 of FIG. 4A so that the ringing reduction effects of circuits 17 and 17' are advantageously combined.

Figure 12:
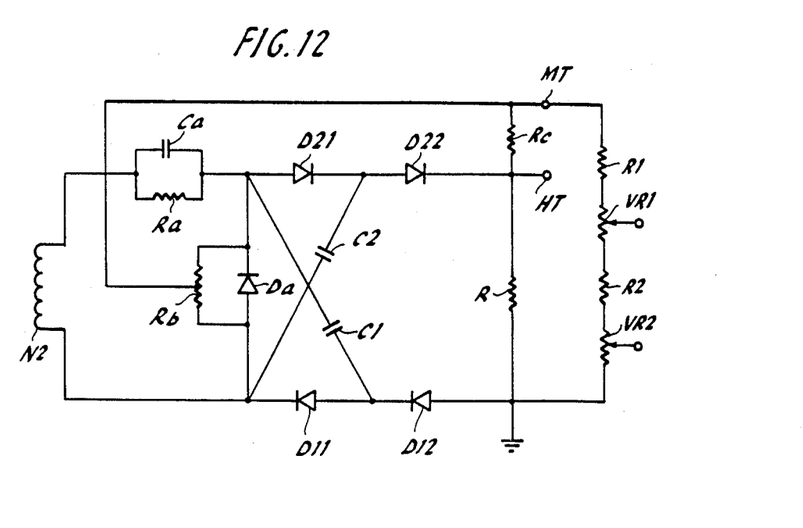
FIGS. 12 and 13 are circuit diagrams of further embodiments of the invention.
Figure 13:
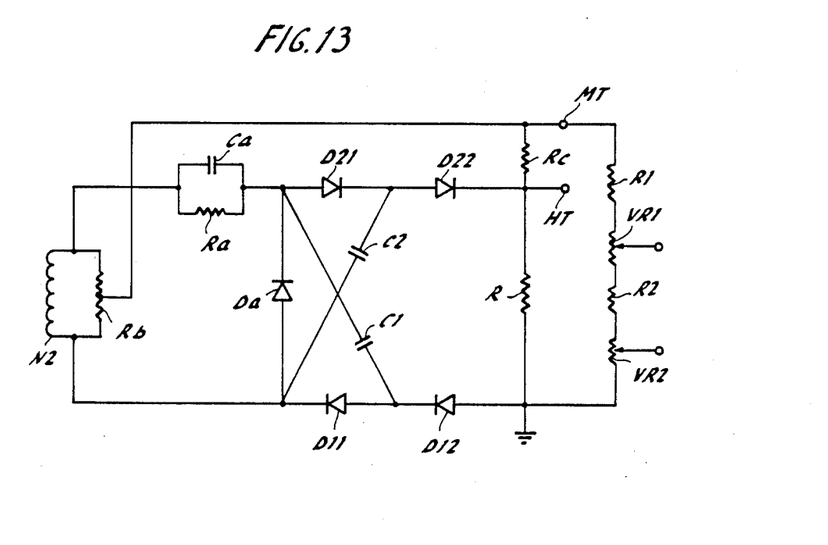

FIGS. 12 and 13 are further modifications of the embodiment of FIG. 4A. In FIG. 12 a resistor Rb is connected in parallel with diode Da. In this resistor 5 there appears no pulse component. Resistor Rb has a neutral point with respect to which the potentials at the cathode and anode terminals of diode Da are symmetrical. The neutral point of resistor Rb is connected to a terminal MT from which a DC output voltage of a medium value is available. The voltage at terminal MT is divided by a voltage dividing resistor network comprising resistors R1 and R2 and variable resistors VR1 and VR2 to develop appropriate voltages for application to focusing and screen electrodes. Preferably, a resistor Rc is connected between terminals MT and HT. Alternatively, the resistor Rb may be connected across the secondary winding N2 as shown in FIG. 13, instead of being connected across the diode Da. By the provision of resistor Rb the neutral point potential can be readily obtained.

The foregoing description shows only preferred embodiments of the present invention. Various modifications are apparent to those skilled in the art without departing from the scope of the present invention which is only limited by the appended claims. For example, the resistor Ra and capacitor Ca of the ringing reduction circuit could equally as well be replaced with a voltage dependent element such as varistors. Therefore, the embodiments shown and described are only illustrative, not restrictive.

What is claimed is:

1. A high voltage DC generator comprising:
    a setup transformer having primary and secondary windings, the primary winding being responsive to a pulse from a pulse generating circuit for inducing a high-voltage potential in said secondary winding;
    a first pair of first and second diodes connected in series in a first circuit from a first end terminal of said secondary winding to a first output terminal of said generator;
    a second pair of first and second diodes connected in series in a second circuit from a second end terminal of said secondary winding to a second output terminal of said generator;
    a first capacitor connected between said second end terminal and a junction of the diodes of the first pair;
    a second capacitor connected between said first end terminal and a junction of the diodes of said second pair, the first diodes of said pairs being arranged to simultaneously conduct in response to said pulse to cause a current to pass through said first and second capacitors in a first direction and the second diodes of said pairs being arranged to simultaneously conduct in response to the cessation of said pulse to cause a current to pass through said first and second capacitors in a second, opposite direction;
    a bleeder resistor connected across said first and second output terminals; and
    a ringing reduction circuit comprising a resistive element, a capacitive element and a diode element, said diode and capacitive elements being arranged such that when one of said first and second diodes of each pair conducts, said diode element is conductive to charge said capacitive element, said resistive element being in circuit with said capacitive element to pass a current therethrough in response to the cessation of said pulse.

2. A high voltage DC generator as claimed in claim 1, wherein said ringing reduction circuit is connected between said first and second end terminals, and wherein said resistive and capacitive elements are connected in parallel relationship and said diode element is connected in series thereto.

3. A high voltage DC generator as claimed in claim 1, wherein said resistive and capacitive elements are connected in parallel relationship in one of said first and second circuits and said diode element is connected across said first and second circuits to form a closed circuit with said capacitive and resistive elements and said secondary winding.

4. A high voltage DC generator as claimed in claim 1, further comprising:
    a third capacitor connected across the first and second diodes of said second pair;
    said diode and resistive elements being series-connected in said second circuit between said second output terminal and a junction where said third capacitor is connected to the second diode of the second pair; and
    said capacitive element being connected in parallel with the series connection of the second diode of the second pair and said diode element.

5. A high voltage DC generator as claimed in claim 4, further comprising a second diode element connected in said second circuit between said resistive element and a junction of the first-mentioned diode element and said capacitive element.

6. A high voltage DC generator as claimed in claim 1, further comprising:
    a third capacitor connected across the first and second diodes of said second pair;
    said diode and resistive elements being series-connected in said second circuit between said second output terminal and a junction where said third capacitor is connected to the second diode of the second pair;
    said capacitive element being connected in parallel with the series connection of the second diode of the second pair and said diode element; further comprising:
    a second resistive element and a second capacitive element connected in parallel relationship with each other in said second circuit; and
    a second diode element connected across said first and second circuits to form a closed circuit with said secondary winding and the parallel connection of said second capacitive and resistive elements.

7. A high voltage DC generator as claimed in claim 6, further comprising a third diode element connected in said second circuit between the first-mentioned resistive element and a junction of the first-mentioned diode and capacitive elements.

8. A high voltage DC generator as claimed in claim 1, further comprising a resistor connected across said diode element to develop a DC voltage at a neutral point of the resistor and means for connecting said neutral point to a third output terminal.

9. A high voltage DC generator as claimed in claim 8, further comprising a second resistor connected between said second and third output terminals.

10. A high voltage DC generator as claimed in claim 8, further comprising a voltage dividing variable resistor network connected across said first and third output terminals to derive an adjustable DC voltage.

11. A high voltage DC generator as claimed in claim 8, further comprising a voltage dividing variable resistor network connected across said first and third output terminals to derive an adjustable DC voltage.

12. A high voltage DC generator as claimed in claim 1, further comprising:
    a third capacitor connected across the first and second diodes of said second pair;
    said diode and resistive elements being series-connected in said second circuit between said second output terminal and a junction where said third capacitor is connected to the second diode of the second pair; and
    said capacitive element being connected in parallel with the series connection of the second diode of the second pair and said diode element; further comprising:
    a resistor connected across said diode element to develop a DC voltage at a neutral point of the resistor; and
    means for connecting said neutral point to a third output terminal.

13. A high voltage DC generator as claimed in claim 12, further comprising a second resistor connected between said second and third output terminals.

14. A high voltage DC generator as claimed in claim 12, further comprising a voltage dividing variable resistor network connected across said first and third output terminals to derive an adjustable DC voltage.

15. A high voltage DC generator as claimed in claim 1, further comprising a resistor connected across said first and second terminals to develop a DC voltage at a neutral point of the resistor and means for connecting said neutral point to a third output terminal.

16. A high voltage DC generator as claimed in claim 15, further comprising a second resistor connected between said second and third output terminals.

17. A high voltage DC generator as claimed in claim 1, further comprising:
    a third capacitor connected across the first and second diodes of said second pair;
    said diode and resistive elements being series-connected in said second circuit between said second output terminal and a junction where said third capacitor is connected to the second diode of the second pair; and
    said capacitive element being connected in parallel with the series connection of the second diode of the second pair and said diode element; further comprising:
    a resistor connected across the first and second terminals to develop a DC voltage at a neutral point of the resistor; and
    means for connecting said neutral point to a third output terminal.

18. A high voltage DC generator as claimed in claim 17, further comprising a second resistor connected between said second and third output terminals.

19. A high voltage DC generator as claimed in claim 17, further comprising a voltage dividing variable resistor network connected across said first and third output terminals to derive an adjustable DC voltage.

* * * * *